(12) United States Patent
Garczynski et al.

(10) Patent No.: US 6,357,658 B1
(45) Date of Patent: Mar. 19, 2002

(54) APPARATUS AND METHODS FOR SCANNING DOCUMENTS INCLUDING OMR, BAR-CODE, AND IMAGE DATA

(75) Inventors: John S. Garczynski, Norristown; Lawrence Hyer, Eagleville; Jeffrey Hahn, Oreland; Steven Wilcox, Marlton; Bernard McDevitt, Norristown, all of PA (US)

(73) Assignee: Peripheral Dynamics, Inc., Plymouth Meeting, PA (US)

( * ) Notice: Subject to any disclaimer, the term of this patent is extended or adjusted under 35 U.S.C. 154(b) by 0 days.

(21) Appl. No.: 09/300,989

(22) Filed: Apr. 28, 1999

(51) Int. Cl.$^7$ .............................. G06K 7/10; G06K 7/14
(52) U.S. Cl. .................... 235/462.01; 235/454; 235/470
(58) Field of Search ................................ 235/375, 454, 235/455, 462.01, 462.04, 470, 487, 486, 485; 382/173, 179, 180, 224, 309, 321, 317

(56) References Cited

U.S. PATENT DOCUMENTS

| | | | |
|---|---|---|---|
| 4,021,777 A | 5/1977 | Shepard | 340/146.3 AH |
| 4,464,681 A | 8/1984 | Jacobs et al. | 358/285 |
| 4,493,108 A | 1/1985 | Fryer et al. | 382/61 |
| 4,760,247 A | 7/1988 | Keane et al. | 235/454 |
| 4,877,948 A | 10/1989 | Krueger | 235/449 |
| 4,949,392 A | 8/1990 | Barski et al. | 382/61 |
| RE33,357 E | 9/1990 | Randall | 358/106 |
| 4,980,778 A | 12/1990 | Wittman | 358/446 |
| 5,001,769 A | 3/1991 | Reid-Green et al. | 382/61 |
| 5,033,097 A | 7/1991 | Nakamura | 382/9 |
| 5,060,280 A | 10/1991 | Mita et al. | 382/33 |
| 5,073,700 A | 12/1991 | D'Onofrio | 235/436 |
| 5,101,447 A | 3/1992 | Sokoloff et al. | 382/61 |
| 5,102,341 A | 4/1992 | Koslin | 434/353 |
| 5,247,166 A | 9/1993 | Cannon et al. | 250/208.1 |
| 5,282,053 A | 1/1994 | Robideau | 358/406 |
| 5,301,243 A | 4/1994 | Olschafskie et al. | 382/59 |
| 5,317,135 A | 5/1994 | Finocchio | 235/375 |
| 5,416,308 A | 5/1995 | Hood et al. | 235/454 |
| 5,428,694 A | 6/1995 | Betts et al. | 382/317 |
| 5,452,379 A | 9/1995 | Poor | 382/317 |
| 5,572,601 A | 11/1996 | Bloomberg | 382/175 |
| 5,608,544 A | 3/1997 | Yamanishi | 358/453 |
| 5,650,863 A | 7/1997 | Utagawa et al. | 358/475 |
| 5,669,816 A | 9/1997 | Garczynski et al. | 463/12 |
| 5,672,060 A | 9/1997 | Poor | 434/322 |
| 5,781,823 A | 7/1998 | Isobe et al. | 399/2 |
| 5,880,451 A | * 3/1999 | Smith et al. | 235/462.15 |
| 5,914,474 A | * 6/1999 | Spitz | 235/462.01 |
| 5,965,863 A | 10/1999 | Parker et al. | 235/462.25 |
| 6,000,612 A | 12/1999 | Xu | 235/454 |

* cited by examiner

Primary Examiner—Michael G. Lee
Assistant Examiner—Larry D Taylor
(74) Attorney, Agent, or Firm—Woodcock Washburn LLP

(57) ABSTRACT

A multifunctional scanner having a first processor, an image scanner, a laser scanner, and a host interface port is provided. The image scanner scans documents to detect the presence of images imprinted thereon, generates image data based on the detected images, generates mark-sense row/column data based on downloaded data masks, and forwards the image data to the first processor. The laser scanner scans documents to detect the presence of bar-code symbols imprinted thereon, decodes the bar code symbols, generates bar code information based on the decoded bar code symbols, and forwards the bar code information to the first processor. The host interface port electrically couples the first processor to an external host processor. The first processor receives the image data from the image scanner, converts the image data into a host datastream, and forwards the host datastream to the external host processor via the host interface port. The first processor also receives the bar code information from the laser scanner, and forwards the bar code information to the host processor via the host interface port.

40 Claims, 10 Drawing Sheets

APPARATUS AND METHODS FOR SCANNING DOCUMENTS INCLUDING OMR, BAR-CODE, AND IMAGE DATA

FIELD OF THE INVENTION

This invention relates to scanning devices. More particularly, the invention relates to a multifunctional scanner capable of automatically handling, scanning, and transmitting mark-sense, bar code, and image data from a document.

BACKGROUND OF THE INVENTION

Forms for recording handwritten marks for entry of data into a data processing system generally have a plurality of discrete areas arranged in a pattern delineated by background printing on the form. The user indicates a choice by placing a line, an "X" or other mark (e.g., entirely filling in the area) in one of a series of areas presented for choice. Each of the areas is typically defined by a box, oval, pair of spaced lines, etc., and the form normally has a field for a number of such choices. Forms of this type are used, for example, to encode a lottery player's choice of numbers for a wager, using a form reader in data communication with a lottery agent terminal and with a central lottery computer.

Upon validation of a player's entry the lottery agent terminal prints an entry ticket showing the player's entry and a serial number or other unique identification. The unique identification may include printed alphanumeric characters as well as bar code, optical character recognition (OCR) characters and/or darkened blocks in a geometric pattern representing numeric data. If the player presents a printed ticket as a winning ticket, the lottery agent enters data from the ticket into the terminal for verification by the lottery central computer over the data communication link. This data can be read automatically in the same manner as a handwritten entry form, using an appropriate scanner. "Instant win" lottery tickets are now in widespread use in many areas. These tickets consist of a game card that has a game play area printed thereon with a number of predetermined spots that are covered with thin, opaque latex coatings. The cards are sold over the counter in retail establishments and the purchaser selectively removes some of the coatings with a coin or other implement to reveal the underlying information. Depending on the game mechanics, the purchaser must match or "beat" other printed areas on the card to determine whether the card is a "winner." If the card is a winner, it can be immediately cashed by presentation to an agent in an establishment that sells the cards to obtain a predetermined cash award.

In many prior art cases, validation of winners was performed manually, although there were significant accounting and ticket handling burdens for the selling agents and the system was prone to clerical errors. In addition, there were potential problems with illegal activities including cashing of altered tickets, theft of paid tickets from the selling establishments, and the cashing of stolen tickets.

Accordingly, computerized cashing apparatus was developed so that tickets could be validated by a central computer. In this scheme, each ticket selling establishment has a remote computer terminal connected to the central computer. In addition to the regular information described above a computer-readable code was printed on the lottery tickets, which code identified each ticket uniquely to the computer. Usually this code was in a bar-code form, and bar code scanners attached to the remote terminal were used to read the code. The information in the code was then forwarded to the central computer for validation.

The scanners used in these prior art systems typically scanned the tickets and forwarded the raw image data (e.g., mark sense or signature data), or bar code data to the host computer. The host computer would then process the image data or bar code data and present the information in a readable format to the user via the host terminal. This approach adds cost and complexity to the host computer and limits the ability to generically match host computers with the optical scanners.

Thus, there is a need in the art for an optical scanner that scans documents containing combinations of mark sense data, signature images, and bar code symbols, and converts the raw image data into a host datastream before forwarding the data to the host processor.

SUMMARY OF THE INVENTION

The present invention satisfies these and other needs in the art by providing a multifunctional scanner that includes a first processor, an image scanner, a laser scanner, and a host interface port. The host interface port electrically couples the first processor to an external host processor. The image scanner scans documents to detect the presence of images imprinted thereon, generates image data based on the detected images, and forwards the image data to the first processor.

The laser scanner scans documents to detect the presence of bar-code symbols imprinted thereon, decodes the bar code symbols, generates bar code information based on the decoded bar code symbols, and forwards the bar code information to the first processor. More particularly, the laser scanner radiates a laser beam into a laser scanning region, receives a reflected laser beam reflected off of a target located within the laser scanning region, analyzes the reflected laser beam to detect the presence of a bar code symbol located within the laser scanning region, decodes the detected bar code symbol into bar code information, and forwards the bar code information to the first processor.

The laser scanner is disposed within the interior region of a housing that has an exit window through which the laser scanner radiates the laser beam. The housing has a top section and a bottom section movably coupled to one another to permit access to the scanning region.

The first processor receives the image data from the image scanner, converts the image data into a host datastream, and forwards the host datastream to the external host processor via the host interface port. The first processor also receives the bar code information from the laser scanner, and forwards the bar code information to the host processor via the host interface port.

The scanner can be used to scan documents having form identifiers that identify the documents as being one of a plurality of form types. The scanner has a processor that stores a set of data masks, each of which corresponds to one of the form types. Each data mask identifies the location of at least one scanning field on the corresponding form type, and associates a data type with the scanning field. The image scanner scans the document to extract the form identifier, retrieves the stored data mask corresponding to the extracted form identifier, determines from the retrieved data mask the location of the scanning field(s) on the document, and scans the scanning field(s) to extract image data of the associated data type.

Where the data type associated with the scanning field includes mark sense data, the image scanner locates marked boxes within the scanning field, and stores in a document scanning memory, row and column indices representing the location of the marked boxes on the document. Where the data type associated with the scanning field includes signature image data, the image scanner locates the signature image within the scanning field, and stores a digital representation of the signature image in the document scanning memory. To reduce memory requirements and increase processing speed during scanning, the scanner combines multiple pixels into single bits before being stored in memory.

The data masks can include predetermined data pitch formats for each line of the corresponding form type. The image scanner sets, for each line of the document being scanned, a data pitch scanning format based on the predetermined data pitch formats included in the corresponding data mask. The data masks can also include a predefined sensitivity threshold for each scanning field. The image scanner adjusts, based on the predefined sensitivity threshold, a current sensitivity threshold for each scanning field on the document.

Where the document to be scanned has more than one dimension (e.g., it is a rectangular lottery form), the image scanner scans the document along the first dimension at a first variable scan density and along the second dimension at a second variable scan density. The first variable scan density and the second variable scan density can vary independently of one another. Thus, the scanner of the present invention can be used to scan documents that include any combination of data types such as mark-sense fields, signature fields, and image fields, even when the multiple data types have varying densities.

To compensate for the effects of folds and creases in a document being scanned, the scanner includes a linear photosensor array, and two light sources, one disposed proximate each side of the photosensor array. A processor, connected to the light sources, that controls the intensity of each illumination element. The light sources direct light into a scanning region such that at least a portion of the directed light reflects off of a target toward the photosensor array. The photosensor array is disposed such that each light sensitive element can capture at least a portion of the reflected light. The scanner can also include a lens, disposed between the photosensor array and the scanning region, that receives the reflected light and focuses the reflected light toward the photosensor array.

Each light sensitive element determines an analog intensity value that represents the intensity of the received light, and communicates the analog intensity value to a processor. The processor receives the analog intensity values from the light sensitive elements, converts each analog intensity value into an intensity bit having a value based on a predefined sensitivity threshold for the corresponding light sensitive element, and translates a plurality of intensity bits into a single black/white bit having a value based on a predefined weighting of the values of the plurality of intensity bits.

The sensitivity thresholds are set during calibration of the scanner, by scanning a calibration target having a known reflectivity, determining a calibration intensity value for each light sensitive element that represents the intensity of the light received by the light sensitive element while the calibration plaque is being scanned, and setting the predefined sensitivity threshold for each light sensitive element to a value based on the calibration intensity value determined for the light sensitive element.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and apparatus disclosed. In the drawings.

DETAILED DESCRIPTION OF THE PREFERRED EMBODIMENTS

Figure 1:
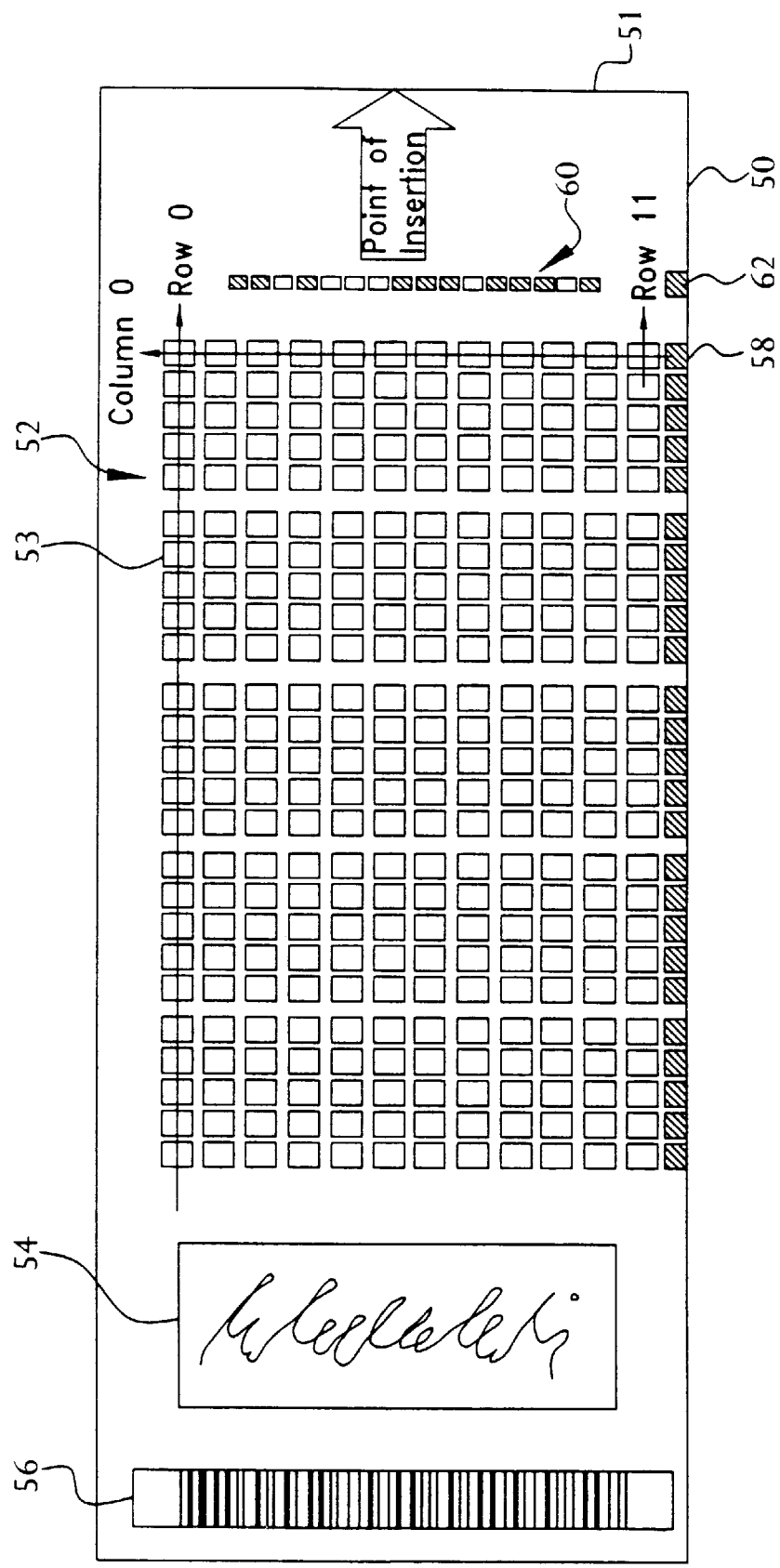
FIG. 1 depicts an exemplary document that can be scanned using the apparatus and methods of the present invention.

FIG. 1 shows an exemplary document 50, such as a lottery selection form, or bet slip, that can be scanned using the apparatus and methods of the present invention. As shown in FIG. 1, document 50 can include a mark sense data field 52, an image data field 54, and a bar code data field 56. Although the document 50 shown in FIG. 1 includes one of each type of data field 52, 54, 56, document 50 can include any combination of zero or more mark sense data fields, image data fields, and/or bar code data fields.

Mark sense data field 52 includes a plurality of databoxes 53, typically aligned in row-column format. As shown in FIG. 1, mark sense data field 52 has twelve data rows across the width (i.e., the narrow dimension) of document 50. Typically, the data rows are on 6.35 mm (0.25") centers. Mark sense data field 52 also has 25 data columns along the length (i.e., the long dimension) of document 50. Typically, a clock mark 58 is associated with each data column. Image data field 54 can include an image such as, for example, a signature. Typically, image data field 54 has a long dimension and a narrow dimension, where the long dimension of image data field 54 can be perpendicular to the long dimension of document 50, as shown in FIG. 1, or parallel thereto. Bar code data field 56 can include either a one-dimensional bar code symbol, as shown in FIG. 1, or a two-dimensional bar code symbol.

Document 50 can also include an identification (ID) code 60 located near one edge 51 of document 50 (typically, the edge that includes the point of insertion). ID code 60 identifies the location and parameters of each data field 52, 54, 56 on document 50. Reference mark 62 indicates the location of ID code 60 on document 50.

Figure 2:
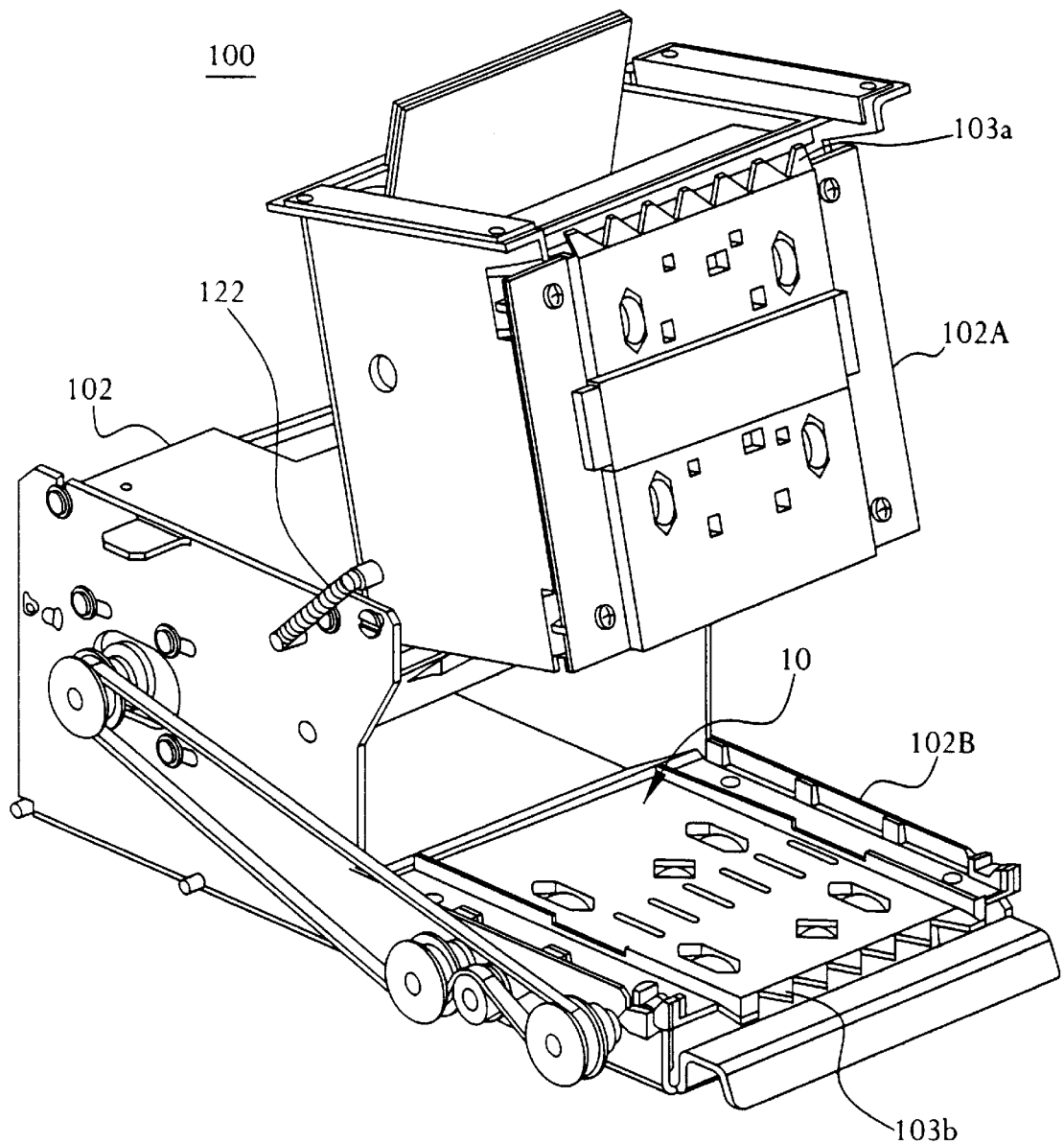
FIG. 2 is an isometric view of a preferred embodiment of a multifunctional scanner according to the present invention.

FIG. 2 shows a perspective view of a multifunctional scanner 100 according to the present invention. Multifunctional scanner 100 includes a housing 102 having a top section 102a and a bottom section 102b. Top section 102a and bottom section 102b are movably coupled to one another via a coupling device 122, such as a spring-loaded hinge, for example, as shown in FIG. 2. A scanning region 10 is located between top section 102a and bottom section 102b. Multifunctional scanner 100 is shown in FIG. 2 with top section 102a hinged open to expose scanning region 10 for easy cleaning or clearing of document jams.

With top section 102a down, a document, such as document 50 shown in FIG. 1, can be fed into multifunctional scanner 100 between rows of teeth 103a and 103b. Scanner 100 includes rows of teeth 103 as an interface between an external throat which, typically, is part of the external casework (not shown), and the entrance to the scanner 100. Thus, rows of teeth 103 function in much the same way as an expansion joint between sections of a bridge deck. Document 50 is scanned as it passes through scanning region 10.

Figure 3:
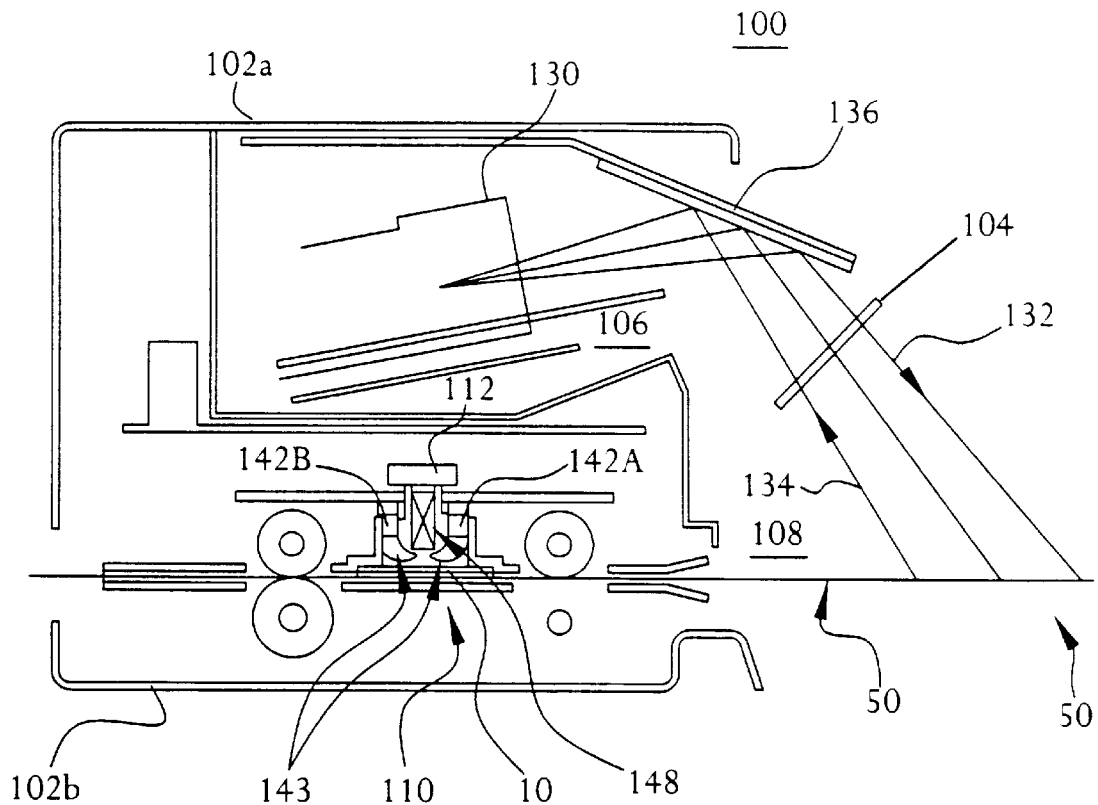
FIG. 3 is a cross-sectional view of a preferred embodiment of a multifunctional scanner according to the present invention.

FIG. 3 shows a cross sectional view of multifunctional scanner 100 that comprises an image scanner 110 and a laser scanner 130. Multifunctional scanner 100 automatically handles, scans, and transmits mark-sense, bar code, and image data from virtually any length document. Preferably, multifunctional scanner 100 is capable of scanning 3.25" documents because 3.25" is the predominant width of tickets used in lottery applications. Multifunctional scanner 100 scans normal mark-sense betslips at high densities, and images customer signatures at 200 dpi, while processing a bet slip in less than one second. Multifunctional scanner 100 can also be equipped with a laser scanner. The laser scanner functions to capture and decode bar-code information from documents such as instant win lottery tickets held in front of the unit.

Scanner 100 processes documents both with and without timing marks, captures signature images, and, optionally, scans 1-Dimensional (1D) and 2-Dimensional (2D) bar code symbols from objects such as documents or labels, on-line receipts, and instant lottery (scratch) products. Scanner 100 can also process pre-printed forms printed with various inks or by thermal methods. Typically, pre-printed forms have data marks which adhere to the same reflectance, print contrast signal (PCS), dimensional, and spacing requirements as bet slips, and are aligned on the same row-centers as bet slips. PCS is a measure of the difference in reflectance between a mark and the paper on which it is printed. PCS=(Rp−Rm)/Rp, where Rp=paper reflectance and Rm=mark reflectance. PCS values specified herein were obtained using the Moore Model 082 tester equipped with a visible light filter operating in the bandpass range of 600–700 nanometers.

The functions of laser scanner 130 and image scanner 110 will now be discussed in greater detail.

Laser Scanner 130

Instant win lottery tickets typically have rub-off areas, which are coated with a latex covering. Scraping the covering from these tickets (to reveal a possible prize or winning combination) produces chaff and debris, a portion of which can adhere to the ticket. For this reason it is preferred to scan the codes for these tickets outside the transport mechanism, since inserting the tickets into the mechanism, can jam or foul the transport or the read station.

Laser scanner 130 produces a laser beam 132 that exits through an exit window 104 and strikes the surface of the object being scanned. Thus, laser beam 132 provides a visible reference, to guide the user in positioning the bar code (on the instant ticket, for example) in front of exit window 104. Exit window 104 is part of housing 102 and defines an interior region 106 and an exterior region 108. As shown in FIG. 3, laser scanner 130 is preferably disposed within interior region 106, and radiates a laser beam 132 through exit window 104 and is deflected off of deflector 136 into exterior region 108. Exits window 104 is preferably part of the same external casework (not shown) that interfaces with rows of teeth 103 (discussed above). Preferably, laser scanner 130 is an OEM modular bar code scanner, such as a Symbol Technologies model SE 2000, which is shock mounted within top section 102a. An object containing a printed bar code symbol, such as an instant lottery ticket, is positioned in front of transparent front panel exit window 104 and, thus, can be scanned outside the transport mechanism.

Laser scanner 130 receives a reflected laser beam 134 which is reflected off of target 50 located within laser scanning region 20. Laser scanner 130 analyzes reflected laser beam 134 to determine whether target 50 has a bar code symbol present within laser scanning region 20. If laser scanner 130 detects the presence of a bar code symbol within laser scanning region 20, laser scanner 130 decodes the detected bar code symbol into bar code information, and forwards the bar code information to a processor 200 (see FIG. 7) connected to laser scanner 130. Processor 200 receives the bar code information from laser scanner 130, and forwards the bar code information to an external host processor via a host interface port 300 connected to processor 200.

Host interface port 300 couples processor 200 to the external host processor which, preferably, is further coupled to a host terminal. The host terminal initiates the scanning of a bar code symbol in response to the depression of a specific key on the terminal keypad. The terminal software then sends a command to multifunctional scanner 100 which then triggers the operation of laser scanner 130. Once triggered, laser scanner 130 microcontrols a raster scan element, causing laser beam 132 to oscillate at a preselected oscillation rate. Laser scanner 130 produces a laser beam 132 in a raster pattern that opens in both X- and Y-directions, preferably via a retrocollective, resonant scan element.

Generally, a scanned document, such as an instant win lottery ticket, will be substantially rectangular, having first and second, or X- and Y-, dimensions. Laser scanner 130 can scan document 20 along each dimension at a different oscillation rate, or scan density. Typically, the oscillation rate is about 570 line scans/sec in the X-direction, for 1-D bar codes, and about 25 frames/sec in the combined X- and Y- directions, for 2-D bar codes. More generally, laser scanner 130 scans instant tickets placed on the counter-top, at the front of the unit. Instant tickets are scanned for an identifiable bar code, first along the X-(horizontal) dimension, to determine whether a decipherable 1-D bar code exists. If not, the laser scan pattern is automatically expanded to a 2-D rectangular frame pattern to attempt to decipher a 2-D bar code.

During scanning, each dark code bar on the surface of the instant ticket absorbs light, while light spaces between bars reflect light. The intensity of the reflected light 134, therefore represents bar code information. Laser scanner 130 decodes the bar code information by sensing, amplifying, filtering, and digitizing the intensity of the reflected light 134. The decoded bar code information is sent as an RS232 serial bit stream to a microcontroller 202 (see FIG. 7), which controls the overall functionality of multifunctional scanner 100.

Image Scanner 110

Multifunctional scanner 100 also includes an image scanner 110 for scanning documents 50, such as bet slips, receipts, or ID documents, as they pass through scanning region 10. Image scanner 110 functions to capture both optical mark reading (OMR) and image data from scanned documents. OMR, or mark-sense data, and image data, such as signature data, are obtained by transporting documents through scanning region 10.

Figure 4:
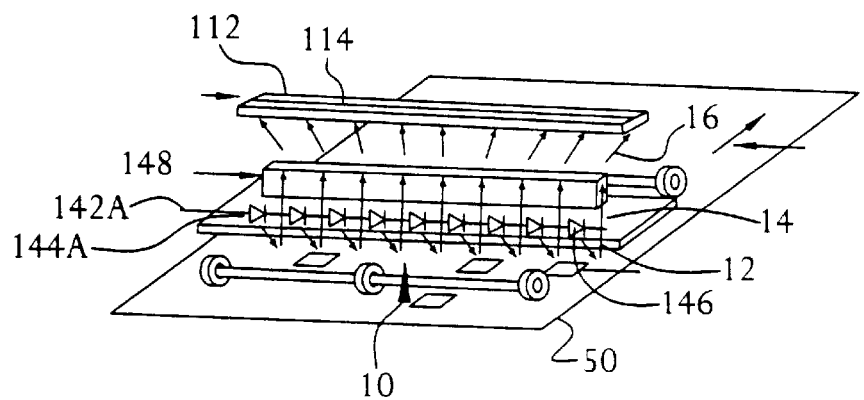
FIG. 4 is an isometric view of a preferred embodiment of an image scanner according to the present invention.

Image scanner 110 comprises a photosensor array 112, which, preferably, is a linear photosensor array, such as a linear charge coupled device (CCD), comprising a plurality of light sensitive elements (not shown) disposed along a photosensor axis 114 (see FIG. 4). In a preferred embodiment, photosensor array 112 comprises 1280 light sensitive elements, or pixels.

To reduce sensitivity to folds or creases in a target document, image scanner 110 comprises a first light source 142a and a second light source 142b. As shown in FIG. 4, first light source 142a comprises a plurality of illumination elements 146, such as shadow-free, solid state, light emitting diodes (LEDs), disposed along a first light source axis 144a. First light source axis 144a is substantially parallel to photosensor axis 114. Similarly, second light source 142b comprises a plurality of illumination elements disposed along a second light source axis (not shown). The second light source axis is also substantially parallel to photosensor axis 114.

Figure 5:
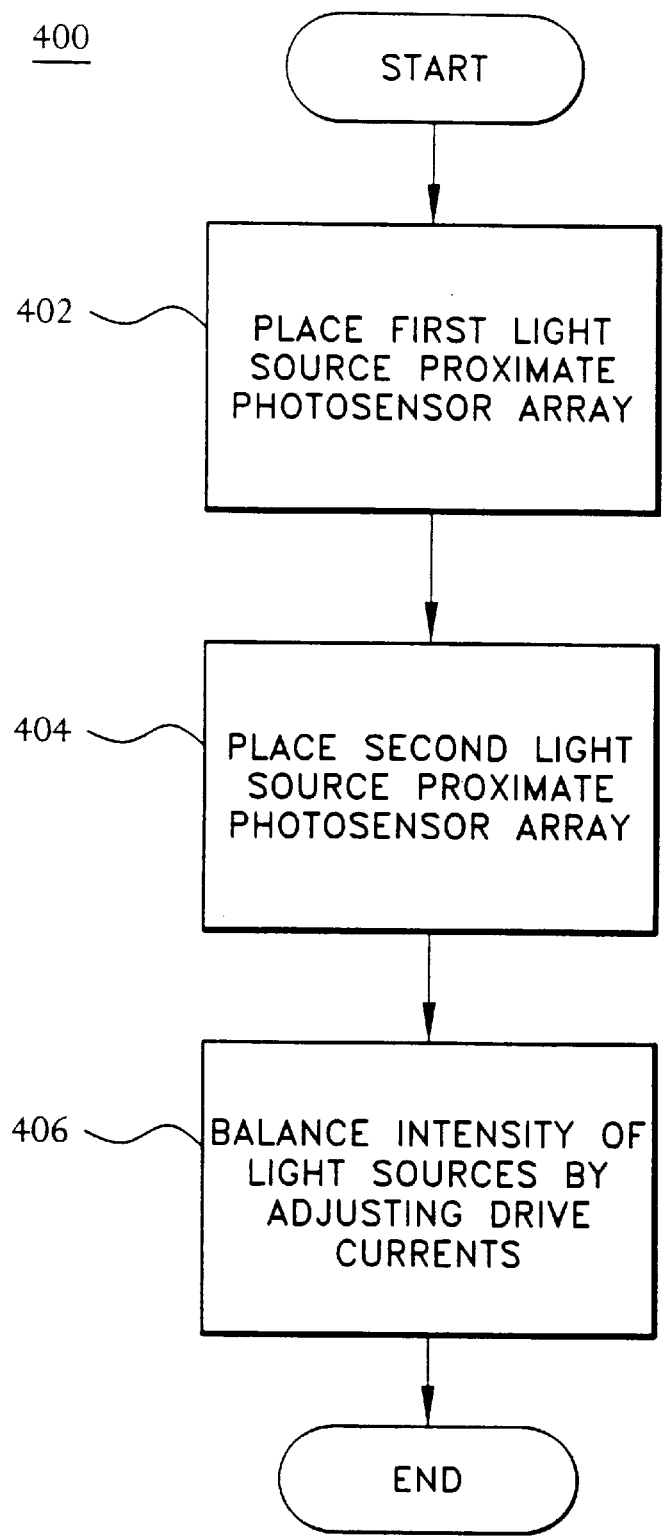
FIG. 5 is a flowchart of a method for compensating for the effects of creases or folds in a document being scanned.

FIG. 5 is a flowchart of a method 400 for compensating for the effects of folds or creases in a document being scanned. At steps 402 and 404, light sources 142a and 142b are disposed on either side of photosensor array 112 to direct light 12 into scanning region 10 such that at least a portion of directed light 12 reflects off the target toward photosensor array 112. In a preferred embodiment, image scanner 110 also comprises a lens 148, such as a gradient-index focusing lens, disposed between photosensor array 112 and scanning region 10. Lens 148 receives reflected light 14 and focuses reflected light 14 toward photosensor array 112. Photosensor array 112 is disposed such that each light sensitive element can capture at least a portion of reflected light 14. That is, photosensor array 112 is positioned to receive focused light 16, from which a line image of the target can be produced.

In a preferred embodiment, light sources 142a and 142b are not physically mounted in the same line location as photosensor array 112. This is because LEDs 146 are typically too large, and the light sensitive elements in photosensor array 112 are too densely packed (e.g., 400 sensors per inch). Dual rows of LEDs are therefore mounted to either side of photosensor array 112, and their illumination is directed by dual prisms 143a, 143b to a focal point directly beneath gradient index lens 148. This produces a line of high intensity illumination, which is reflected from the surface of document 50 and focused back through gradient index lens 148 to the line of light sensitive elements of photosensor array 112.

At step 406, the intensity of light sources 142a and 142b are balanced. A balanced light source minimizes the effects of document folds and creases, by eliminating shadows. With the dual string of LEDs, any imperfection in the paper (fold or crease), is illuminated from all sides. Two sides of the imperfection are illuminated by the opposing LEDs (on opposite sides of each pixel). The remaining sides of any imperfection are illuminated by the contribution of light from adjacent LEDs in the string.

Light sources 142a and 142b, which consist of several strings of illumination LEDs 146, are also connected to microcontroller 202 (see FIG. 6), which sets the LED intensity. Each light source 142a, 142b comprises a string of LEDs 146 (preferably, 8 LEDs 146 in each string), which are driven by an OP-AMP 154 from a D/A converter 152 controlled by microcontroller 202. The LEDs 146 in each string are selected for relatively consistent intensity characteristics, such that control of the current through each string by microcontroller 202 varies the intensity of the entire string in a linear fashion.

Microcontroller 202 balances the LED intensity from each row 142 of LEDs 146 by calibrating the LEDs 146 using a special calibration form, or plaque. The calibration form is selected for its reflective characteristics, such that its reflectance at a wavelength of 660 nm (red light) closely approximates the center of the grayscale range (or the desired black/white switching point of the scan head). The calibration procedure (light intensity setting) is accomplished by issuing a calibration command to image scanner 110, followed by inserting and transporting the calibration form into image scanner 110, until it is positioned in scanning region 10. At that time, microcontroller 202 sets threshold register 204 at one-quarter of the dynamic (voltage) range of the analog-to-digital convertor (not shown) from black toward white.

Microcontroller 202 then turns-on a single row 142 of LEDs 146, and adjusts their current, through D/A converter 152 and OP-AMP driver 154, until half of the pixels of photosensor array 112 are determined to be brighter than the threshold. Microcontroller 202 then stores this value of LED current drive, and re-adjusts the threshold level to half the dynamic range of the A/D converter. Microcontroller 202 then turns-on the second row of LEDs (the row opposite the sensor array), and again adjusts the current through the second string of LEDs again until half the pixels of the scan head switch on. Light sources 142a and 142b are then balanced, and microcontroller 202 stores both values of the current drive for the two strings of LEDs, and then proceeds to determine the grayscale switching value for each pixel in the CCD array 112.

Figure 6:
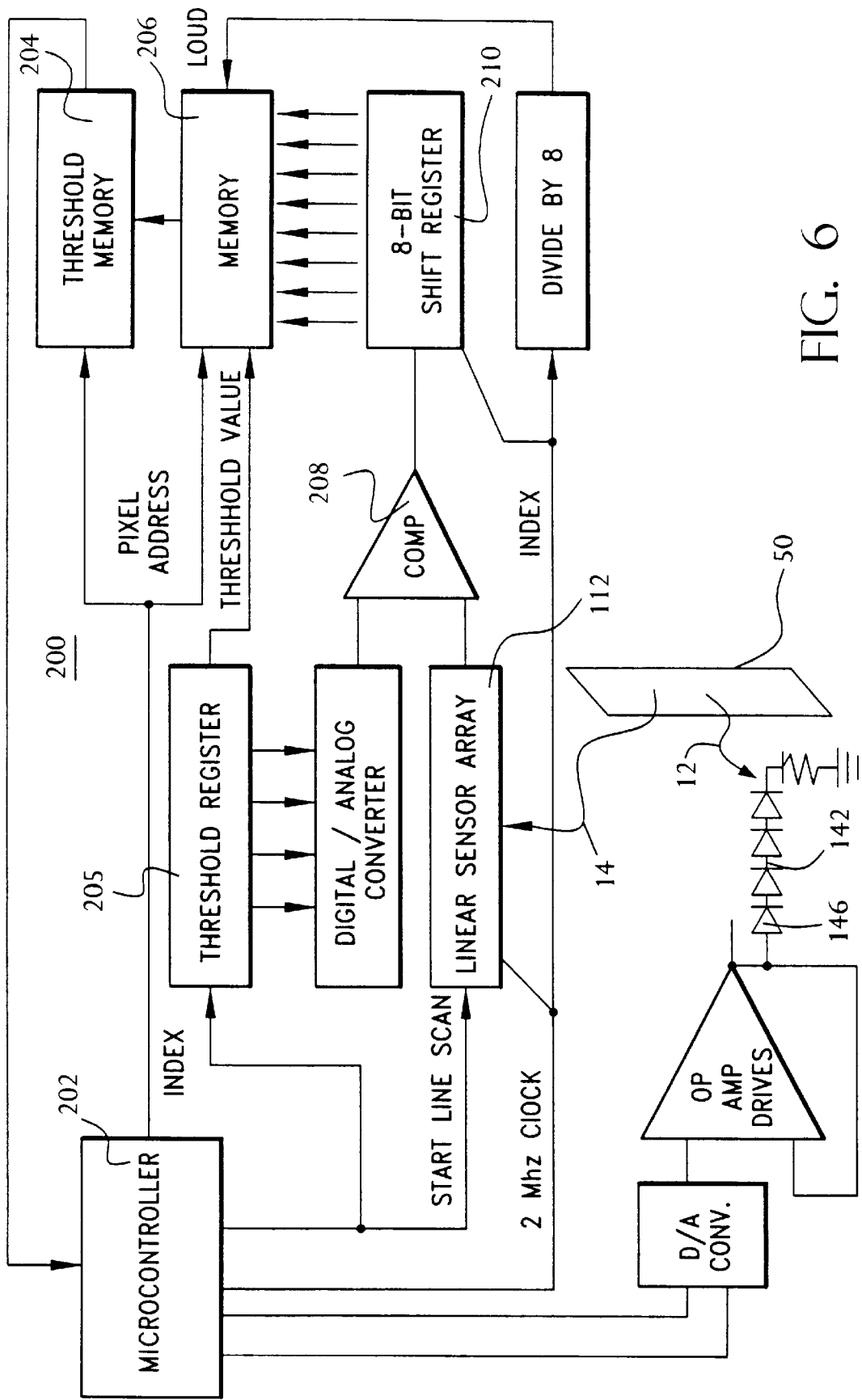
FIG. 6 is a block diagram of a preferred embodiment of a processor for use in calibrating a scanner.

FIG. 6 is a block diagram of a preferred embodiment of a processor for use in calibrating a scanner. As shown in FIG. 6, processor 200 comprises a threshold memory 204 for storing a set of predefined (i.e., calibrated) sensitivity threshold values, each of which corresponds to one of the light sensitive elements. The sensitivity thresholds are set initially by scanning a calibration target, or calibration plaque. Under command from the host, scanner 100 enters calibration mode. In this mode, the calibration plaque is inserted and transported through scanning region 10. The calibration plaque is a specialized, uniformly ink-coated form, having predetermined reflectance characteristics at selected wavelengths.

The color of the standard calibration plaque as seen by the human eye, is incidental. Preferably, the calibration plaque is beige, although it is the reflectance characteristic at the wavelength of light being used, i.e., the percentage of light reflected by the ink at the color of the LED light source (660 nm red), which is of primary importance. Any portion of a document which reflects more light (i.e., is whiter than) the calibration plaque, produces a signal above the stored threshold level for the pixels in that region, which results in a white image being stored in memory for that portion of the document.

In fact, several different calibration plaque colors (usually pastels) can be used for calibration, depending upon any slight adjustment in threshold desired. Each plaque has a slightly different reflectance, with each slightly altering the threshold values stored by the calibration operation. For instance, if a dark gray, or black plaque were used for the calibration procedure, then only images which reflect very little light (very dark images), would produce output signals below the stored threshold values, to yield dark pixels.

After such a dark calibration, if a normal white form is then fed into the scanner, most pixels would receive sufficient reflected light from the white form to exceed the dark stored threshold, and the scan of the form would look washed-out.

As the calibration plaque is scanned, a calibration intensity value is determined for each light sensitive element. The calibration intensity value represents the intensity of the light received by the corresponding light sensitive element when the calibration plaque is being scanned. The sensitivity threshold for each light sensitive element is then set to a value based on the calibration intensity value determined for that light sensitive element.

Preferably, image scanner 110 uses a calibration technique that dynamically determines and stores black/white switching thresholds for all the pixels of photosensor array 112. Threshold determination on a pixel basis enhances sensitivity and accuracy by compensating for a number of variations, including input voltage variations (which cause brightening and dimming of light sources 142a, 142b). These variations in illumination, coupled with long-term LED degradation, cause photocurrent amplitude variations which effects all LEDs randomly in an irregular and unpredictable manner. Pixel thresholding also compensates for temperature effects. It is known that the gain of the photosensor and the intensity of light sources 142a, 142b are affected by temperature variations. Similarly, it is known that certain sensors will be more sensitive than others, even in the same sensor chip/wafer. Thus, the calibration technique of the present invention compensates for individual sensor and LED non-uniformity. Finally, pixel thresholding is advantageous because it compensates for non-linearities in the optical path, i e., certain sensors and LEDs will have better optical alignment, or focusing, than others. To compensate for these known effects, the sensitivity and threshold levels for each light sensitive element are periodically adjusted, during normal scanner usage, and these levels are stored in threshold memory 204 on either an individual or a small group basis.

According to a preferred embodiment of the methods of the present invention, the calibration procedure is initiated on command from the host. A calibration plaque is inserted into scanner and fed into scanning region 10. With the calibration document within scanning region 10, microcontroller 202 adjusts the LED light source intensities, as described above. Microcontroller 202 determines the threshold for each pixel of the scan head based on the reflectivity of the calibration plaque inserted. This is accomplished by loading threshold register 204 with all ones, which is the maximum white level of the sensor range. Microcontroller 202 then initiates another scan of the calibration plaque, compares the analog value of each pixel to the all white level of threshold register 204 (converted to an analog level), and stores the result of this scan in memory 206. Note that, in this instance, the result for each pixel should be a one, since the reference plaque is darker than the all white threshold.

Next, microcontroller 202 decrements the value in threshold register 204 and initiates another scan, again storing the results in memory 206. This process is continued for a number of scans until threshold register 204 contains all zeros. The number of scans determines the differential change in each step and, preferably, a binary number of scans is performed (i.e., a multiple of two; e.g., 16). The actual number of scans performed, however, can be any number. Note that the last scan will store all zeros in memory 206 since the calibration plaque is now lighter than the value in threshold register 204. Through the middle scans, each pixel comparison will yield a one or a zero, depending upon whether the pixel output has crossed the threshold represented by the current output of threshold register 204.

Microcontroller 202 then reviews the results of the scans to determine the values at which each pixel crossed the threshold. These threshold values are then stored in pixel threshold memory 204. Threshold values can be re-calibrated using this technique as often as required. Furthermore, lighter or darker calibration plaques (utilizing different ink and reflectance characteristics) can be used whenever lighter or darker image capture is required.

Preferably, threshold memory 204 is a non-volatile memory so that microcontroller 202 can reference the threshold values for each pixel stored in threshold memory 204 even after scanner 100 has been turned-on after a period of non-use. After calibration, subsequent documents are scanned for black/white pixel content using the stored threshold values.

For capturing images, such as signatures, located on document 50, image scanner 110 transports document 50 through scanning region 10, past photosensor array 114. Image scanner 110 scans the document to detect the presence of images located thereon and generates image data based on the detected images. Preferably, images of specified areas on the form are captured at 200 dpi during the input transport cycle. Image scanner 110 forwards the image data to processor 200 which post-processes the image data (i.e., converts the image data into a host datastream), and forwards the host datastream in compressed format to the external host processor via host interface port 300.

Figure 7:
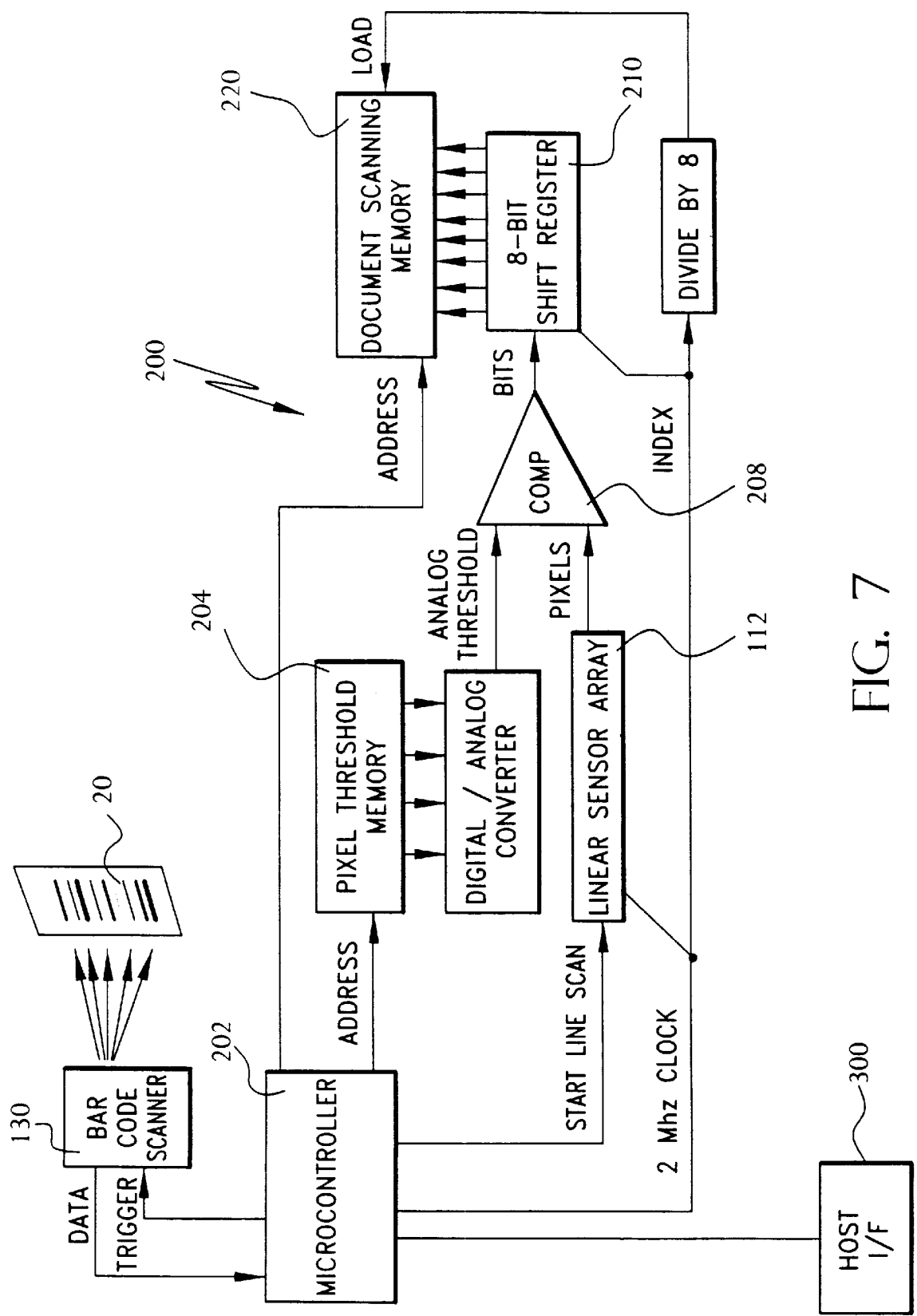
FIG. 7 is a block diagram of a preferred embodiment of a processor for use in scanning image data.
Figure 8:
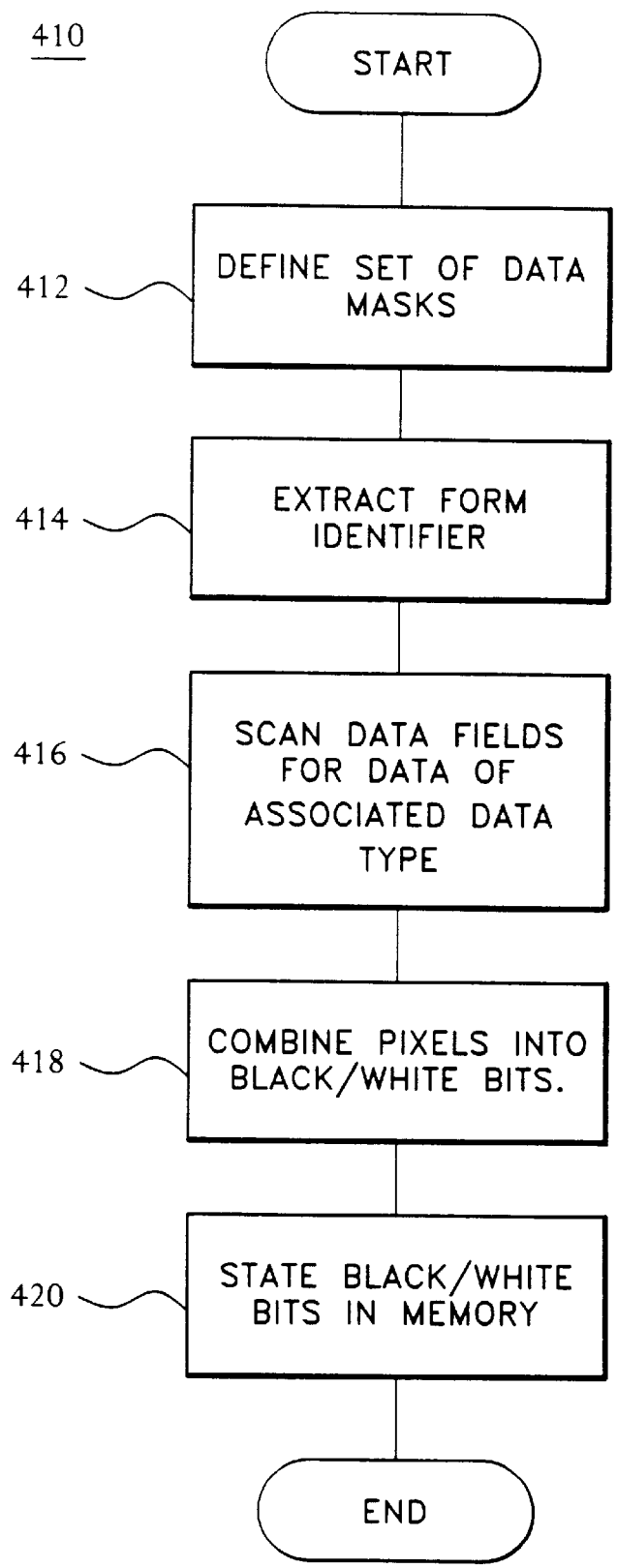
FIG. 8 is a flowchart of a method for scanning a document in accordance with the present invention.

Document scanning can be understood by referring to the block diagram of FIG. 7 and the flowchart of FIG. 8. According to the present invention, a set of data masks is defined at step 412. Each datamask corresponds to one of a plurality of predefined forms, identifies the location of at least one scanning field on the corresponding form, and associates a data type with each identified scanning field. The data types can include any combination of mark-sense data, image data, and bar code data, and the different data types can have varying densities. Data masks and unique ID codes, which define individual data filed, are downloaded by command from the host PC. These data masks are stored in the scanner's non-volatile memory.

At step 414, the document is scanned to extract a form identifier therefrom. If the form identifier corresponds to one of the stored predefined form types, at step 416 the location of each identified scanning field is determined from the data mask corresponding to the predefined form and these fields are scanned to extract data of the associated data type. If the data type includes mark sense data, marked boxes within the scanning field are located and row and column indices representing the location of the marked boxes are stored in a document scanning memory. If the data type includes signature image data, a signature image is located within the scanning field, and a digital representation of the signature image is stored in the document scanning memory.

The data mask can include a predetermined data pitch format for each line of the corresponding form. In this case, for each line of the document, a data pitch scanning format is set based on the predetermined data pitch format included in the corresponding data mask. Thus, while the document is being scanned, the data pitch format can be dynamically adjusted on a line-by-line basis. Similarly, the data mask can include a predefined sensitivity threshold for each scanning field on the predefined form. In this case, the scanner adjusts its sensitivity threshold for each scanning field on the corresponding predefined sensitivity threshold.

The data is extracted from the document in the form of pixels, where each pixel has a value that represents the intensity of the light reflected off of the document. To reduce memory requirements and improve processing performance, at step 418 a plurality of pixels are combined into a single black/white bit before being stored in memory at step 420. The value of the black/white bit is determined based on whether the value of each of a predefined subset of the plurality of pixels exceeds a predefined threshold.

For example, as a target document 50 (e.g., ticket or bet slip) is transported through scanning region 10, light 12 is absorbed by dark marks and reflected by the lighter spaces between marks. Preferably, photosensor array 112 contains 1280 light sensitive elements or pixels, arrayed in a line. Each pixel is focused onto an adjacent 0.0025" area of the document's surface (i.e., 400 dots per inch). All 1280 pixels of the array are scanned for each single line-width sample of the surface of the ticket. These light amplitude samples, representing a "slice" of the document, are sequentially clocked at a clocking frequency (e.g., at 2 Mhz) through comparator 208 and compared against their corresponding stored threshold values. The results of the comparison are then loaded as a black/white data bit stream into document scanning memory 220. Shift register 210 ensures that each 8-bit segment of the line scan is clocked into an adjacent memory location. Thus, a full line scan at 400 dpi (1280 bits per line scan) occupies 160 bytes of memory.

At 400 dpi (dots per inch) in both the X- and Y-directions, a typical 8 inch long lottery form contains over 4 million pixel samples, or bits. To store, process and transmit this amount of data, a large amount of memory and several seconds of transmission time are needed, even at reasonably high baud rates. For more rapid data processing, and for those requirements permitting lower resolution, image scanner 110 combines a plurality of pixels into a single black/white bit based on whether the plurality pixels represents a "black" grouping or a "white" grouping. Whether the plurality of pixels represents a black grouping or a white grouping is described in greater detail below.

The number of pixels/bit can be set by host command, and depends upon whether mark sense or image data is required. For mark sense data, image scanner 110 normally combines four or eight pixels into a single black/white bit, yielding resolutions of 0.010 or 0.020 inches. For image scanning (e.g., signature capture), image scanner 110 uses one or two pixels perbit (0.0025" resolution/400 dpi, or 0.005" resolution/200 dpi) for greater detail. The resolution can be set by external command at 400, 200, 100 or 50 dpi. Image capture at reduced resolutions occupies commensurately less document memory.

Image scanner 110 can capture signature images on any target, but is particularly suitable for use with any length 3.25" wide forms such as lottery receipts and selection slips. As an alternative to image capture areas defined by specific for ID, signature capture mode can also be entered by a specific command from the host. Preferably, multifunctional scanner 100 is either a sub-assembly of a gaming terminal, which has a host processor that controls the operation of the sub-assemblies, or a stand-alone scanner, which is attached to a personal computer (PC) through a serial communications port. In either case, the operator who views the ticket recognizes the type of form to be inserted and depresses a key or series of keys to generate a macro-command to image scanner 110. The signature command itself normally defines the size and location of the signature area on the next form to be scanned (i.e., signature coordinate information). Processor 200 uses the signature coordinate information to increase throughput, scanning only the required image area at high resolution, as opposed to a simple brute-force high-resolution image scan of the entire document.

Data is normally transmitted in the orientation scanned, but may be rotated in memory to present a view consistent with normal viewing (e.g., portrait vs. landscape). The entire form may be imaged at 200 dpi, but to conserve memory, as well as processing and transmission times, signature areas are normally restricted to smaller rectangular areas. Signatures are most frequently scanned at 200 dpi, and data is transmitted as a black/white image in either raw pixel form (80 bytes/line scan, maximum), or compressed via facsimile group 4 algorithm.

Figure 9:
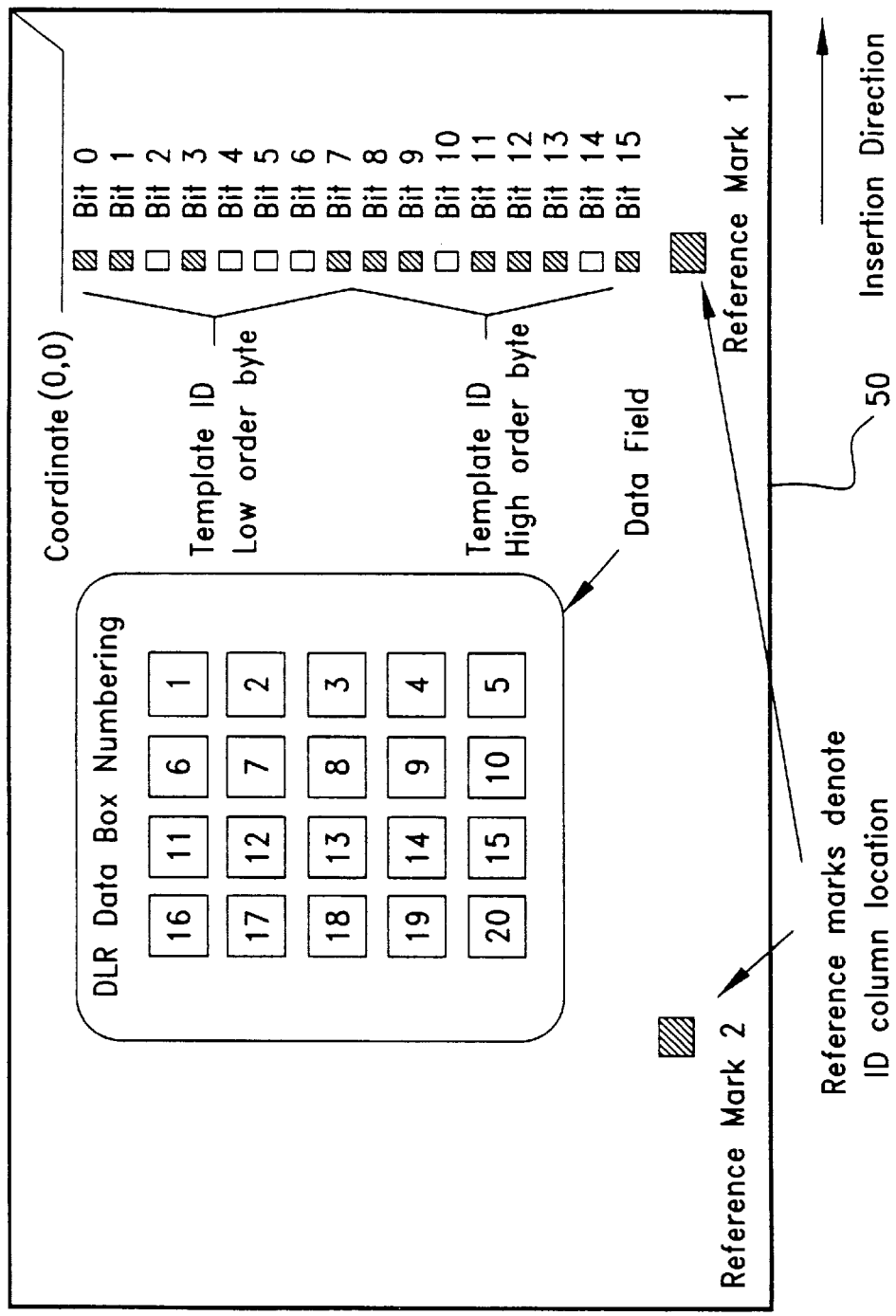
FIG. 9 depicts a standard form that includes an identification code.

For mark-sense scanning, (normally associated with marked boxes on a pre-defined grid), image scanner 110 identifies a particular stored data mask, associating this mask with a specific identification (ID) code. As shown in FIG. 9, the ID code (shown as Bit 0–Bit 15) is located at the beginning (i.e., front) of each form, and is scanned first when the form is inserted into the unit. When scanner 100 scans an ID code in the first column of a form, it retrieves a particular mask from memory. The mask identifies the location and parameters of each individual data area for that specific form. For instance, the mask shown in FIG. 9 would indicate a single data field, its x-y displacement from the origin (0,0 coordinate), the size of the data area, the number of data rows (e.g., five) and data columns (e.g., four), and the size and displacement of the data boxes within the data field.

Preferably, the data masks are stored in non-volatile memory and are recalled and identified by image scanner 110, immediately upon sensing a valid, scanned ID code. The data masks specify the location of pre-determined data areas on the document 50. These areas are reserved for mark sense data capture. Image scanner 110 locates all marked data boxes within the data field, and transmits the row and column location for each individually marked data box.

Figure 10:
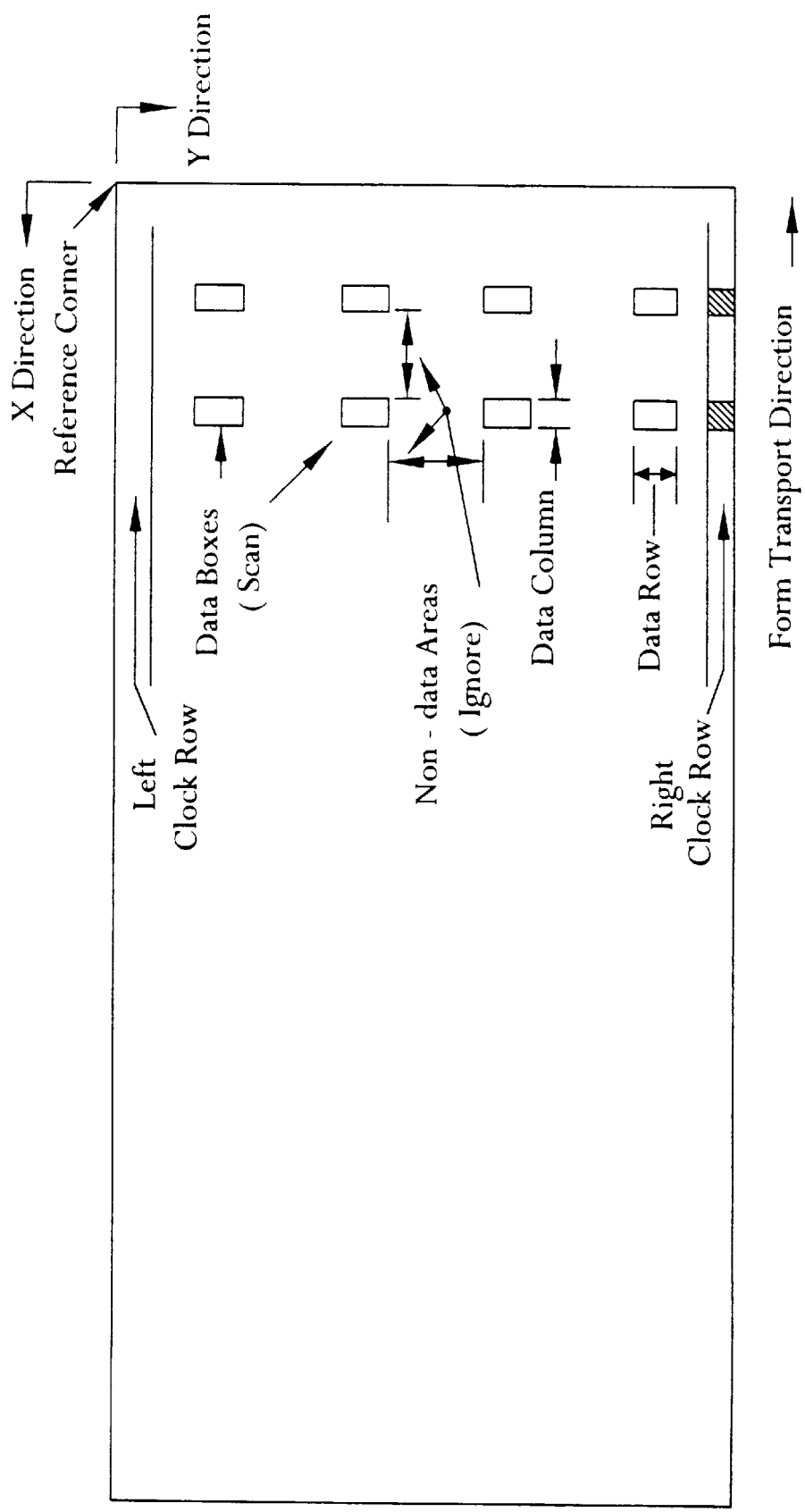
FIG. 10 depicts a standard clock mark selection form.

To read mark sense data, processor 200 uses an internal memory mask, stored in data mask memory 222. The mask is used to determine whether each 8-bit pixel grouping (for each line scan) is located within the confines of any data box area of the form. If a particular pixel grouping (or bit) is outside of a data box area, this bit or group of pixels are discarded by the scanner, resulting in less data being transferred and, therefore, faster data processing. The locations of data boxes on the form are measured in units of resolution (for example, in 0.005" increments for 200 dpi), relative to the x, y coordinate distances from the reference corner of the document (see FIG. 9). Memory masks are downloaded to image scanner 110 prior to the first ticket insertion whenever a new format is used. Image scanner 110 has sufficient memory to store up to 128 different masks. Masks are retained in non-volatile Flash memory. FIG. 10 shows a typical form including areas of the form to be scanned, and those to be ignored (i.e., masked). Horizontal distances to be scanned are usually, although not always, associated with clock marks.

Image scanner 110 reads and decodes data from forms (bet slips) both with and without standard data clock (timing) marks. Precise document transport, using a step motor under micro-processor control, provides accurate data detection both across and along the form. Data masks, down-loaded from the host, and stored in non-volatile memory, are used for rapid identification and scanning of pre-determined data areas.

In the absence of a particular ID code, the scanner is preferably programmed to default to reading selection slips with timing marks. In this mode, the unit reports data for only marked data boxes of a pre-determined size, located on specified row centers, and delineated by clock mark column positions. The scanner specifies the number of data locations marked, transmitting two bytes for each marked box. The bytes define the column/row coordinates in which the data mark was detected.

Preferably, image scanner 110 defaults to processing selection slips with clock marks located at the right edge of the slip (along the slip's length/long dimension). The unit normally scans slips with data marks coincident with clock marks (although slips with data boxes between clock marks, and slips with clock marks located along the left edge of the form are also routinely processed under command from the host). The scanner can also be commanded to function with other predetermined combinations of marks, bar-codes, or images as default conditions.

Normally, clock marks are printed using non-reflective (e.g. black) ink. Pre-printed clock marks normally provide a PCS value of greater than 0.85 when measured as described above. For optimum processing results, the clock marks should have sharp edges, be of uniform intensity, and be free of ink smudges and specks in areas between clock marks. Data box outlines, or marking patterns, are normally printed using reflective (e.g., red) ink, which is invisible when illuminated by the scanner's red light sources.

Using its stored data mask, microcontroller 202 determines, on a scan-line by scan-line basis, where, in terms of pixel distances, the data boxes are located on a particular form. All other scanned pixels (i.e., those located in areas between data boxes) are ignored (e.g., discarded).

Figure 11:
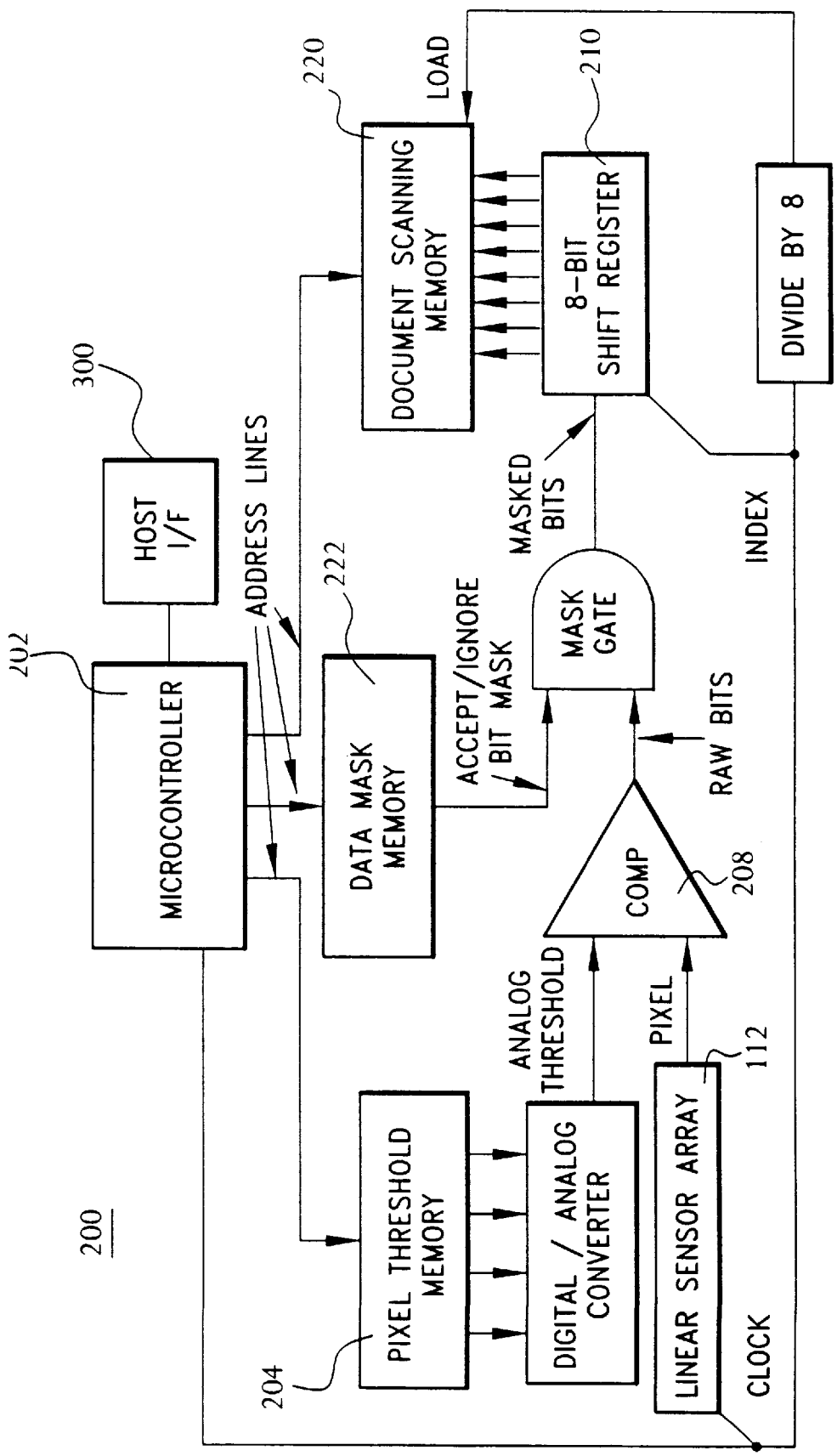
FIG. 11 is a block diagram of a processor for use in scanning mark sense data.

As shown in the block diagram of FIG. 11, microcontroller 202 uses data mask memory 222, which contains previously downloaded datamasks, to gate-out, or ignore, all spaces between data boxes. With this method, marks detected in the area between boxes need not be stored in document scanning memory 220, which saves both memory and data processing time.

Data boxes normally have fixed, preset dimensions. For example, a typical lottery ticket data box may be 0.160" high×0.080" wide. At 400 dpi, the portion of a single vertical scan line located within the confines of a single data box will scan 64 (i.e., 0.160/0.0025) pixels into memory. Considering that at 400 dpi, it is necessary to perform 32 (i.e., 0.080/0.0025) line scans to cover the width of the data box, the number of pixels per data box scanned into memory is 2048 (i.e., 64×32) pixels per data box.

This large number of high resolution bits is normally excessive for simple mark-sense line scanning. Lower resolutions are often used for this application. Image scanner 110 scans documents at 400 dots per inch (dpi). Pixel resolution across the scan head is 400 dpi, and the unit images documents both across and along the form at 400 dpi. Lower resolution images, however, are often desired. This is accomplished by combining a plurality of adjacent pixels into single bits, and transporting the document with a step accuracy commensurate with the resolution of the horizontal scan. For instance, at 200 dpi, each pair of adjacent pixels are combined into a single bit, and forms are transported using a step motor accuracy of 0.005"/step, thus providing 200 dpi resolution both across and along the document.

Image scanner 110 combines this lower resolution mark-sense scanning with a unique logic masking and thresholding scheme, to compress multiple pixels into single bits. This process is used to both save memory and to speed-up data computation calculations. With this method, image scanner 110 continues to look at all pixels in a line (400 dpi), but groups two, four, or eight pixels into a single bit, through a logical weighting technique.

For instance, at 100 dpi resolution, image scanner 110 examines each group of four pixels using host selectable parameters. In the simplest variation, image scanner 110 merely determines if any of the four pixels (100 dpi resolution assumed) is black, and if so, considers the entire group of four pixels to be black. A second alternative determines, for instance, that three out of four pixels must be black to consider the group black. Combining four pixels into a single bit (in the direction of the scan line) results in a reduction in the number of data pixels (bits) per data box line scan to 16 (i.e., 64/4)bits per data box per line scan. Pixel size at this 100 dpi scan rate increases from 0.0025" to 0.010" diameter (in the direction of the scan), which is still quite sufficient for mark-sense applications.

It can be seen that this grouping of bits (e.g., three of four must be black), provides a method for de-speckling of the form, such that small ink spots (speckles) are eliminated. It can be further seen that, not only are the pixel size and memory requirements of the system affected using this technique, but so is the threshold of the scanner. Scanning a mark for which three of the four contiguous pixels must exceed a dark threshold (being black) requires a somewhat darker mark than determining that only one of the four pixels was black. Utilizing this technique, microcontroller 202 can further vary the sensitivity of image scanner 110 to bias the sensitivity in favor of either faint or bold marks.

This technique is applicable for multiple pixel groupings (resolutions). For instance, at 200 dpi, the requirement that either one or two (out of two) pixels per bit being dark can be used to enter dark pixels (bits) into memory. Similarly, at 50 dpi, the unit can specify that any number of pixels (e.g., one to eight out of eight), will determine a dark bit for memory storage.

Image scanner 110 also uses a weighting technique to determine the percentage of dark to white pixels contained in a data box. Microcontroller 202 determines whether the box is "marked" based upon the percentage of black to white bits contained in the data box (the percentage used in this determination also affects the scanner's threshold). In addition, since image scanner 110 "knows" the location of each dark pixel within a data box, it makes use of algorithms to weight dark pixels in the center of the box more heavily than dark pixels on the box's periphery, and to weight contiguous dark pixels more heavily than isolated ones (i.e., noise). Preferably, the data boxes are printed with reflective ink Preferably, all background printing, such as the printing of data boxes, is printed using reflective ink (e.g., reflective in the 600–700 nm range) so that they are not detected during the scanning process. Such ink provides a PCS of less than 0.10, referenced to an unprinted section of the form.

Hand marking can be done with any medium that is sufficiently dark and non-reflective. For optimum performance, marks should be clear, legible, and exhibit a minimum PCS of 0.65 when measured as described above. A standard #2 lead pencil gives reflectance readings of about 3% (PCS>0.90) and works well for marking tickets because of both availability and ease with which mistakes may be corrected. Most blue, black and green ball point pens and markers also provide good reflectance properties and can be used to mark the tickets.

Since image scanner 110 uses high resolution image optics, marks may be made in a variety of shapes and sizes (i.e. filled boxes, faint lines, circles, dots, lines and crosses anywhere within data boxes), provided that the marks exhibit a PCS value of greater than 0.65, and have a stroke width greater than 0.012" (0.305 mm).

At the conclusion of scanning a ticket for valid data, microprocessor 202 "knows" the location of all marked data boxes on the form. It is thereafter a straightforward matter for processor 200 to transmit the row/column locations (ticket data box coordinates) of the marked data boxes to an external host processor via host interface 300. In addition, image scanner 10 has the image of the mark in document scanning memory 220 such that look-up tables can be used to differentiate between different kinds of marks. For example, look-up tables can be created so that image scanner 110 can distinguish marks such as, for example, X vs. O, Y vs. N, or+vs.–.

Preferably, scanner 100 reads selection slips in a reflective mode. For optimum performance, therefore, certain paper stocks, printing inks and dimensional specifications are preferred. Preferably, all paper stock has a minimum reflectance of 70% as measured with a Moore Model 082 (or equivalent) tester using a barium sulfate plaque as standard for 100% reflectance. Measurements are taken in either the visible red or the near infra-red region. Preferable paper stock dimensions are about 82.55 mm+/–0.12 mm (3.25"+/–0.005") in width, from about 101.6 mm (4.0") to about 228.6 mm (9.0") in length, and from 0.100 mm (0.0039") to 0.200 mm (0.0079") in thickness, with a nominal thickness of about 0.114 mm (0.0045").

In a preferred embodiment, multifunctional scanner 100 is modular and is equipped with side slide-rails for easy removal from any terminal enclosure. Scanner 100 incorporates an electrostatic discharge (ESD) shield for safe handling of mounted electronic printed circuit (PC) boards whenever scanner 100 is removed from the terminal enclosure. The optical components included within scanner 100 are glass covered. Laser scanner 102 is protected from contamination from paper dust by a unique plastic molded dust shield located within top section 102.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

We claim:

1. A multifunctional scanner comprising:

a first processor;

an image scanner, connected to the first processor, that scans documents to detect the presence of images imprinted thereon, generates image data based on the detected images, and forwards the image data to the first processor;

a laser scanner, connected to the first processor, that scans documents to detect the presence of bar-code symbols imprinted thereon, decodes the bar code symbols, generates bar code information based on the decoded bar code symbols, and forwards the bar code information to the first processor; and a host interface port, connected to the first processor, that electrically couples the first processor to an external host processor, wherein, the first processor receives the image data from the image scanner, converts the image data into a host datastream, and forwards the host datastream to the external host processor via the host interface port, and wherein the first processor receives the bar code information from the laser scanner, and forwards the bar code information to the host processor via the host interface port.

2. The multifunctional scanner of claim 1, wherein the laser scanner radiates a laser beam into a laser scanning region, receives a reflected laser beam reflected off of a target located within the laser scanning region, analyzes the reflected laser beam to detect the presence of a bar code symbol located within the laser scanning region, decodes the detected bar code symbol into bar code information, and forwards the bar code information to the first processor.

3. The multifunctional scanner of claim 2, further comprising:

a housing, mechanically coupled to the image scanner, that has an exit window and defines an interior region and an exterior region, wherein the laser scanner is disposed within the interior region, and radiates the laser beam through the exit window into the exterior region.

4. The multifunctional scanner of claim 1, further comprising:

a housing, mechanically coupled to the image scanner, having a top section and a bottom section defining a scanning region therebetween, wherein the top section and the bottom section are movably coupled to one another to permit access to the scanning region.

5. A scanner for scanning a document having imprinted thereon a form identifier that identifies the document as being one of a plurality of form types, the scanner comprising:

a processor having a memory for storing a set of data masks, wherein each data mask corresponds to one of the form types, and wherein each data mask identifies the location of at least one scanning field on the corresponding form type, and associates a data type with the at least one scanning field, and wherein each data mask includes predetermined data pitch formats for each line of the corresponding form type; and an image scanner, connected to the processor, that scans the document to extract the form identifier therefrom, retrieves from the memory the stored data mask corresponding to the extracted form identifier, determines from the retrieved data mask the location of the at least one scanning field on the document, sets, for each line of the document being scanned, a data pitch scanning format based on the predetermined data pitch formats included in the corresponding data mask, and scans the at least one scanning field to extract image data of the associated data type.

6. The scanner of claim 5, further comprising:

a document scanning memory connected to the image scanner, wherein the data type associated with the at least one scanning field includes mark sense data, and wherein the image scanner locates at least one marked box within the scanning field, and stores in the document scanning memory row and column indices representing the location of the marked box on the document.

7. The scanner of claim 5, further comprising:

a document scanning memory connected to the image scanner, wherein the data type associated with the at least one scanning field includes signature image data, and wherein the image scanner locates the signature image within the scanning field, and stores a digital representation of the signature image in the document scanning memory.

8. The scanner of claim 5, wherein the data mask includes a predefined sensitivity threshold for each scanning field, and wherein the image scanner adjusts, based on the predefined sensitivity threshold, a current sensitivity threshold for each scanning field on the document.

9. The scanner of claim 5, wherein the document has first and second dimensions, and wherein the image scanner scans the document along the first dimension at a first variable scan density, and wherein the image scanner scans the document along the second dimension at a second variable scan density, and wherein the first variable scan density and the second variable scan density vary independently of one another.

10. The scanner of claim 5, wherein a plurality of pixels are combined into single black/white bits before being stored in said memory.

11. The scanner of claim 5, wherein the document includes at least two data types from the group of data types consisting of mark-sense fields, signature fields, and image fields, and wherein the at least two data types have varying densities.

12. The scanner of claim 5, wherein the image scanner retrieves a default data mask corresponding to a default form type if the extracted form identifier does not correspond to one of the stored data masks or if the document does not include a form identifier.

13. A method for scanning a document, the method comprising:
defining a set of data masks, wherein each data mask corresponds to one of a plurality of predefined forms, identifies the location of at least one scanning field on the corresponding form, associates a data type with each identified scanning field, and wherein at least one data mask includes a predetermined data pitch format for each line of the corresponding form;
scanning the document to extract a form identifier therefrom;
determining whether the form identifier corresponds to one of the predefined forms; and
if the form identifier corresponds to one of the predefined forms, determining the location of each identified scanning field from the data mask corresponding to the predefined form, setting, for each line of the document, a data pitch scanning format based on the predetermined data pitch format included in the corresponding data mask, and scanning each identified scanning field to extract data of the associated data type.

14. The method of claim 13 wherein the data type associated with the scanning field includes mark sense data, the method further comprising:
locating at least one marked box within the scanning field; and
storing in a document scanning memory, row and column indices representing the location of the marked box on the document.

15. The method of claim 13 wherein the data type associated with the at least one scanning field includes signature image data, the method further comprising:
locating a signature image within the scanning field; and
storing a digital representation of the signature image in a document scanning memory.

16. The method of claim 13, wherein the data mask includes a predefined sensitivity threshold for each scanning field, the method further comprising:
adjusting a current sensitivity threshold for each scanning field on the document based on the corresponding predefined sensitivity threshold.

17. The method of claim 13, wherein the document has first and second dimensions, the method further comprising:
scanning the document along the first dimension at a first variable scan density; and
scanning the document along the second dimension at a second variable scan density.

18. The method of claim 17, wherein the first and second variable scan densities vary independently of one another.

19. The method of claim 13, further comprising:
extracting the data from the document in the form of pixels, wherein each pixel has a value that represents an intensity of light reflected off of the document;
combining a plurality of pixels into a single black/white bit, wherein the value of the black/white bit is determined based on whether the value of each of a predefined subset of the plurality of pixels exceeds a predefined threshold; and
storing the black/white bits in a memory.

20. The method of claim 13, wherein the document includes at least two data types from the group of data types consisting of mark-sense data, image data, and bar code data, and wherein the data types have varying densities.

21. A scanner for scanning a document having imprinted thereon a form identifier that identifies the document as being one of a plurality of form types, the scanner comprising:
a processor having a memory for storing a set of data masks, wherein each data mask corresponds to one of the form types, and wherein each data mask identifies the location of at least one scanning field on the corresponding form type, and associates a data type with the at least one scanning field, and wherein the data mask includes predetermined data pitch formats for each line of the corresponding form type; and
an image scanner, connected to the processor, that scans the document to extract the form identifier therefrom, retrieves from the memory the stored data mask corresponding to the extracted form identifier, determines from the retrieved data mask the location of the at least one scanning field on the document, scans the at least one scanning field to extract image data of the associated data type, and adjusts, based on the predefined sensitivity threshold, a current sensitivity threshold for each scanning field on the document.

22. The scanner of claim 21, further comprising:
a document scanning memory connected to the image scanner,
wherein the data type associated with the at least one scanning field includes mark sense data, and wherein the image scanner locates at least one marked box within the scanning field, and stores in the document scanning memory row and column indices representing the location of the marked box on the document.

23. The scanner of claim 21, further comprising:
a document scanning memory connected to the image scanner,
wherein the data type associated with the at least one scanning field includes signature image data, and wherein the image scanner locates the signature image within the scanning field, and stores a digital representation of the signature image in the document scanning memory.

24. The scanner of claim 21, wherein the document has first and second dimensions, and wherein the image scanner scans the document along the first dimension at a first variable scan density, and wherein the image scanner scans the document along the second dimension at a second variable scan density, and wherein the first variable scan density and the second variable scan density vary independently of one another.

25. The scanner of claim 21, wherein a plurality of pixels are combined into single black/white bits before being stored in said memory.

26. The scanner of claim 21, wherein the document includes at least two data types from the group of data types consisting of mark-sense fields, signature fields, and image fields, and wherein the at least two data types have varying densities.

27. The scanner of claim 21, wherein the image scanner retrieves a default data mask corresponding to a default form type if the extracted form identifier does not correspond to one of the stored data masks or if the document does not include a form identifier.

28. A scanner for scanning a document having imprinted thereon a form identifier that identifies the document as being one of a plurality of form types, the scanner comprising:

a processor having a memory for storing a set of data masks, wherein each data mask corresponds to one of the form types, and wherein each data mask identifies the location of at least one scanning field on the corresponding form type, and associates a data type with the at least one scanning field; and an image scanner, connected to the processor, that scans the document to extract the form identifier therefrom, retrieves from the memory the stored data mask corresponding to the extracted form identifier, determines from the retrieved data mask the location of the at least one scanning field on the document, scans the at least one scanning field to extract image data of the associated data type, and retrieves a default mask corresponding to a default form type if the extracted form identifier does not correspond to one of the stored data masks or if the document does not include a form identifier.

29. The scanner of claim 28, further comprising:

a document scanning memory connected to the image scanner, wherein the data type associated with the at least one scanning field includes mark sense data, and wherein the image scanner locates at least one marked box within the scanning field, and stores in the document scanning memory row and column indices representing the location of the marked box on the document.

30. The scanner of claim 28, further comprising:

a document scanning memory connected to the image scanner, wherein the data type associated with the at least one scanning field includes signature image data, and wherein the image scanner locates the signature image within the scanning field, and stores a digital representation of the signature image in the document scanning memory.

31. The scanner of claim 28, wherein the document has first and second dimensions, and wherein the image scanner scans the document along the first dimension at a first variable scan density, and wherein the image scanner scans the document along the second dimension at a second variable scan density, and wherein the first variable scan density and the second variable scan density vary independently of one another.

32. The scanner of claim 28, wherein a plurality of pixels are combined into single black/white bits before being stored in said memory.

33. The scanner of claim 28, wherein the document includes at least two data types from the group of data types consisting of mark-sense fields, signature fields, and image fields, and wherein the at least two data types have varying densities.

34. A method for scanning a document, the method comprising:

defining a set of data masks, wherein each data mask corresponds to one of a plurality of predefined forms, identifies the location of at least one scanning field on the corresponding form, associates a data type with each identified scanning field, and includes a predefined sensitivity threshold for each scanning field;

scanning the document to extract a form identifier therefrom;

determining whether the form identifier corresponds to one of the predefined forms;

adjusting a current sensitivity threshold for each scanning field on the document based on the corresponding predefined sensitivity threshold; and if the form identifier corresponds to one of the predefined forms, determining the location of each identified scanning field from the data mask corresponding to the predefined form, and scanning each identified scanning field to extract data of the associated data type.

35. The method of claim 34, wherein the data type associated with the scanning field includes mark sense data, the method further comprising:

locating at least one marked box within the scanning field; and storing in a document scanning memory, row and column indices representing the location of the marked box on the document.

36. The method of claim 34, wherein the data type associated with the at least one scanning field includes signature image data, the method further comprising:

locating a signature image within the scanning field; and storing a digital representation of the signature image in a document scanning memory.

37. The method of claim 34, wherein the document has first and second dimensions, the method further comprising:

scanning the document along the first dimension at a first variable scan density; and scanning the document along the second dimension at a second variable scan density.

38. The method of claim 37, wherein the first and second variable scan densities vary independently of one another.

39. The method of claim 34, further comprising:

extracting the data from the document in the form of pixels, wherein each pixel has a value that represents an intensity of light reflected off of the document;

combining a plurality of pixels into a single black/white bit, wherein the value of the black/white bit is determined based on whether the value of each of a predefined subset of the plurality of pixels exceeds a predefined threshold; and storing the black/white bits in a memory.

40. The method of claim 34, wherein the document includes at least two data types from the group of data types consisting of mark-sense data, image data, and bar code data, and wherein the data types have varying densities.

* * * * *